(12) United States Patent
Dahlhauser et al.

(10) Patent No.: US 10,849,319 B2
(45) Date of Patent: Dec. 1, 2020

(54) LIQUID PLACEMENT APPARATUS

(71) Applicant: 360 Yield Center, LLC, Morton, IL (US)

(72) Inventors: Lee Dahlhauser, Heyworth, IL (US); Lucas Helton, Tremont, IL (US)

(73) Assignee: 360 Yield Center, LLC, Morton, IL (US)

( * ) Notice: Subject to any disclaimer, the term of this patent is extended or adjusted under 35 U.S.C. 154(b) by 82 days.

(21) Appl. No.: 15/620,822

(22) Filed: Jun. 12, 2017

(65) Prior Publication Data

US 2017/0354137 A1    Dec. 14, 2017

Related U.S. Application Data

(60) Provisional application No. 62/348,823, filed on Jun. 10, 2016.

(51) Int. Cl.

| | |
|---|---|
| *A01M 7/00* | (2006.01) |
| *B05B 15/16* | (2018.01) |
| *B05B 15/72* | (2018.01) |
| *B05B 13/02* | (2006.01) |
| *B05B 15/70* | (2018.01) |
| *B05B 15/14* | (2018.01) |
| *B05B 13/00* | (2006.01) |
| *A01C 23/04* | (2006.01) |

(52) U.S. Cl.
CPC ........... *A01M 7/006* (2013.01); *A01C 23/047* (2013.01); *A01M 7/0042* (2013.01); *A01M 7/0053* (2013.01); *A01M 7/0064* (2013.01); *B05B 13/005* (2013.01); *B05B 13/0278* (2013.01); *B05B 15/14* (2018.02); *B05B 15/16* (2018.02); *B05B 15/70* (2018.02); *B05B 15/72* (2018.02); *A01M 7/005* (2013.01); *A01M 7/0078* (2013.01)

(58) Field of Classification Search
CPC .. A01M 7/006; A01M 7/0042; A01M 7/0053; A01M 7/0064; B05B 15/14; B05B 15/16; B05B 15/72; B05B 15/70; B05B 13/005; B05B 13/0278; A01C 23/047
USPC .................................................. 239/159–170
See application file for complete search history.

(56) References Cited

U.S. PATENT DOCUMENTS

| | | | | |
|---|---|---|---|---|
| 1,974,166 | A | * | 9/1934 | Thompson ............ A01M 7/005 239/169 |
| 2,301,213 | A | * | 11/1942 | Kang .................... A01M 7/005 47/1.7 |

(Continued)

*Primary Examiner* — Joseph A Greenlund
(74) *Attorney, Agent, or Firm* — Thomas J. Oppold; Larkin Hoffman Daly & Lindgren Ltd.

(57) ABSTRACT

An apparatus and method of applying liquid product to a crop growing in a field. A plurality of drop assemblies are laterally spaced along the boom structure, each of the plurality of drop assemblies include a boom mounting bracket which supports a vertical support member and a spray assembly disposed at a lower end of the vertical support member, the boom mounting bracket having a first pivot axis oriented substantially perpendicular to the boom structure. The drop assemblies are movable from a working position to a transport position. In the transport position the vertical support member is pivoted about the first axis such that the vertical support member is oriented toward the boom structure. In the working position the vertical support is oriented substantially perpendicular to the boom structure.

16 Claims, 21 Drawing Sheets

(56) References Cited

U.S. PATENT DOCUMENTS

Figure 1:
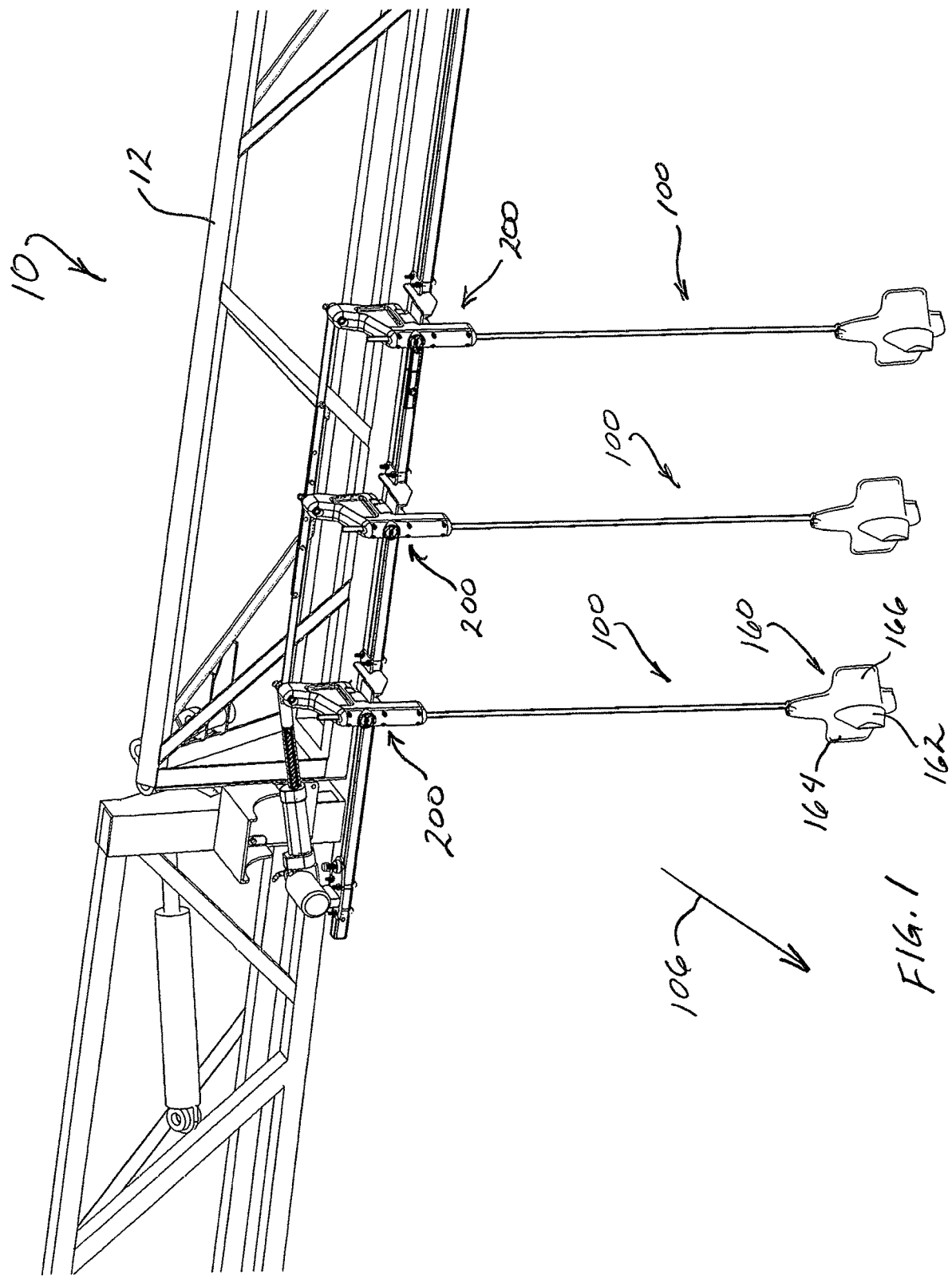
Figure 2:
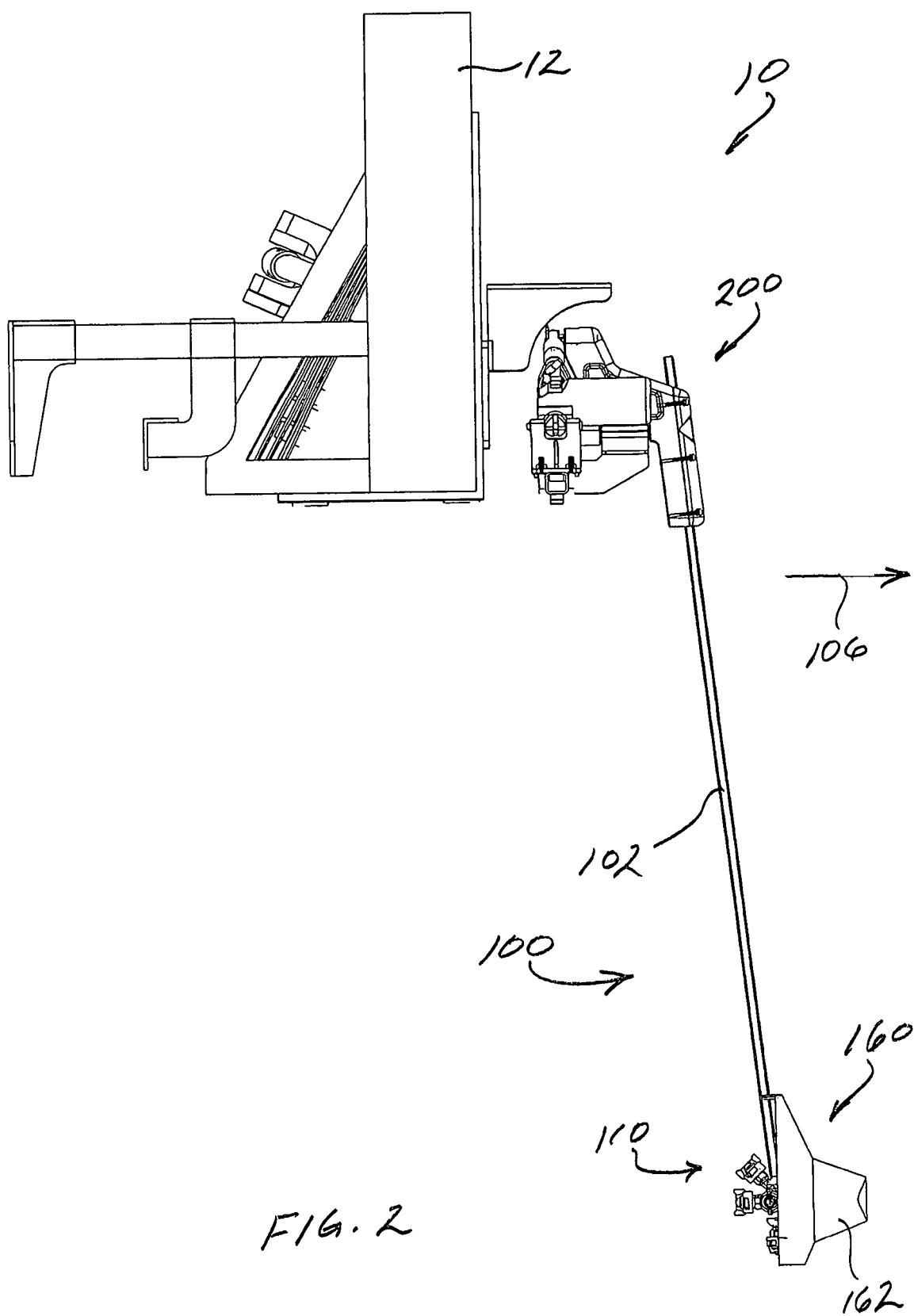
Figure 3:
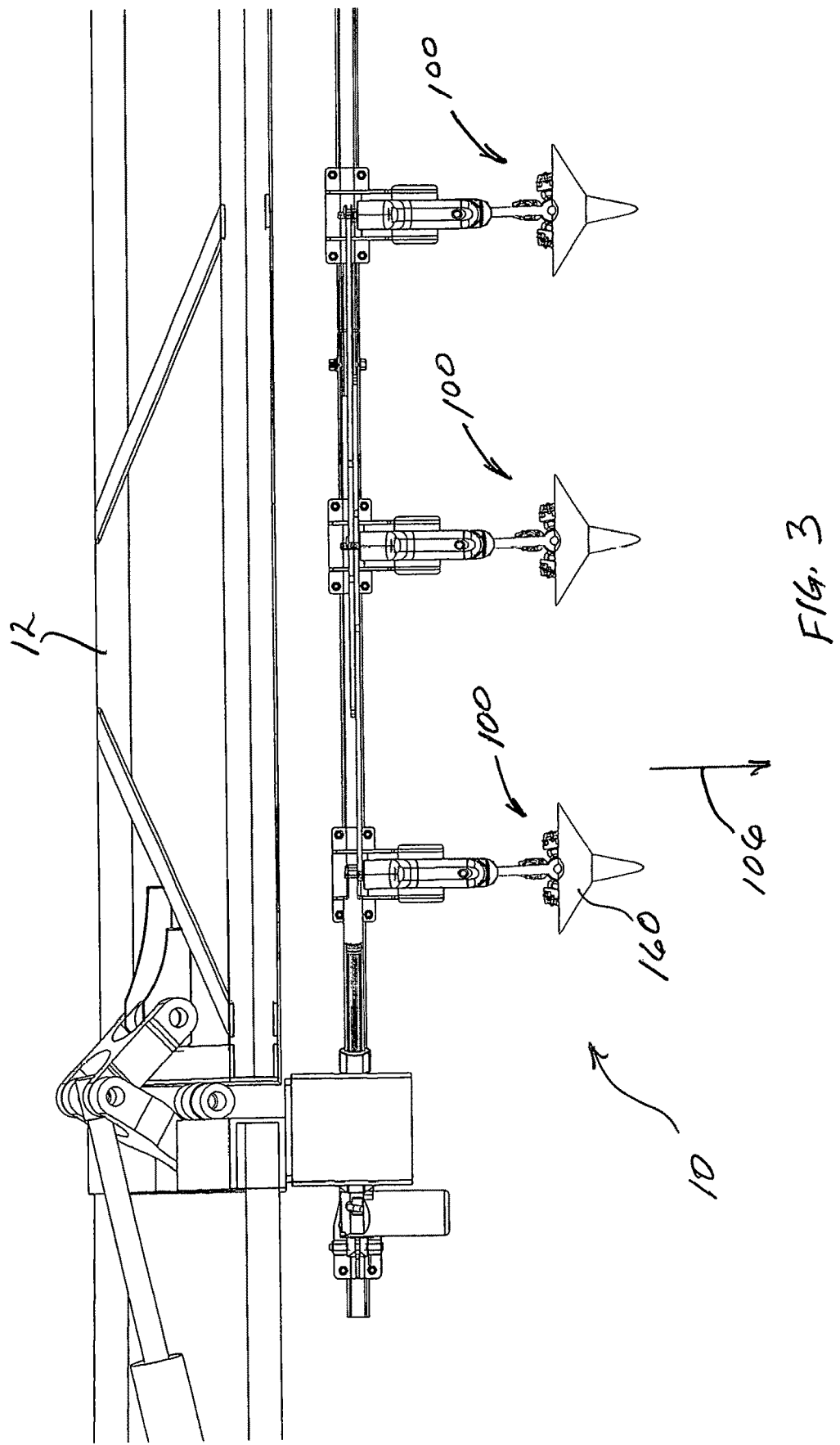

| | | | | |
|---|---|---|---|---|
| 2,692,799 A * | 10/1954 | Parrott | B05B 9/08 239/152 |
| 2,706,133 A * | 4/1955 | North, Jr. | A01M 7/006 239/565 |
| 3,147,568 A * | 9/1964 | Inhofer | A01M 7/0064 47/1.7 |
| 3,625,428 A * | 12/1971 | Mecklin | A01M 7/005 239/166 |
| 4,350,294 A * | 9/1982 | Gaspard | A01M 7/005 239/169 |
| 4,521,988 A * | 6/1985 | Thacker | A01M 7/0064 47/1.7 |
| 4,736,888 A * | 4/1988 | Fasnacht | A01M 7/005 239/161 |
| 4,842,195 A * | 6/1989 | Koll | B05B 15/68 239/1 |
| 5,899,276 A * | 5/1999 | Relyea | A62C 31/24 169/24 |
| 6,021,959 A * | 2/2000 | Mayfield, Jr. | A01M 7/0014 239/67 |
| 6,202,941 B1 * | 3/2001 | Baek | A01M 7/0075 239/161 |
| 6,375,089 B1 * | 4/2002 | Taylor | A01M 7/0042 239/1 |
| 6,453,832 B1 * | 9/2002 | Schaffert | A01C 5/062 111/150 |
| 6,659,374 B1 * | 12/2003 | Chiera | B05B 13/0431 239/587.2 |
| 7,252,112 B1 * | 8/2007 | Imler | F16L 37/004 137/614.04 |
| 10,076,075 B1 * | 9/2018 | Muff | B05B 1/20 |
| 10,144,028 B2 * | 12/2018 | Turnage | B05B 12/34 |
| 2006/0118654 A1 * | 6/2006 | Shivak | A01C 23/008 239/166 |
| 2013/0043326 A1 * | 2/2013 | Muff | A01C 23/047 239/159 |
| 2013/0119153 A1 * | 5/2013 | Hoeben | B05B 15/16 239/288.3 |
| 2013/0276923 A1 * | 10/2013 | Wolff | F16L 37/32 137/614.02 |
| 2014/0263730 A1 * | 9/2014 | Gednalske | A01M 7/0064 239/159 |
| 2014/0318650 A1 * | 10/2014 | Wolff | F16L 37/004 137/614.02 |
| 2016/0120117 A1 * | 5/2016 | Lawrence | A01C 23/008 239/164 |
| 2016/0229680 A1 * | 8/2016 | Cornett | B67D 7/04 |
| 2017/0118908 A1 * | 5/2017 | Ritland | A01B 61/044 |
| 2017/0354137 A1 * | 12/2017 | Dahlhauser | B05B 13/005 |
| 2019/0000067 A1 * | 1/2019 | Heinsohn | A01M 7/0057 |

* cited by examiner

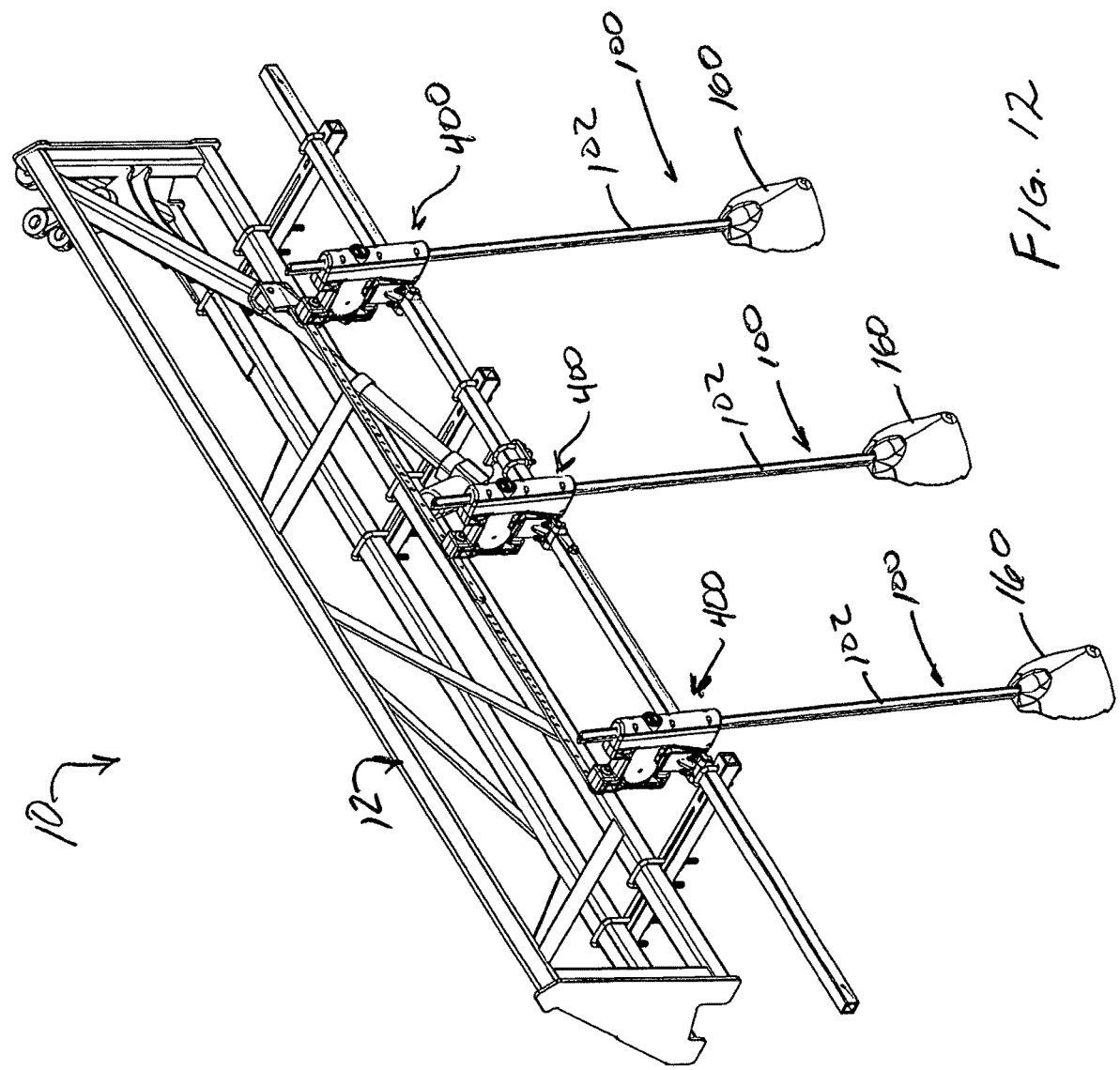

LIQUID PLACEMENT APPARATUS

BACKGROUND

In modern farming practices, broadcast applications of fertilizers or other liquid products to assist plant growth are common practice. For example, applying starter fertilizers at planting in furrow or subsurface presents an opportunity to assist plant nutrient needs for a short period of time, and in very limited amounts. Moreover, world goals of an average corn yield of 300 bushels per acre and average soybean yields of 100 bushels per acre have been suggested to help support the ever-growing population's food and energy needs. Agronomic specialists are developing new genetics in grains, creating genetic potential to achieve these higher yield goals. However, conventional liquid product application systems are useful only at the beginning of the plant's life and, especially when used later in a plant's life, create a significant amount of waste as they spray liquid products in the air above the plants. Accordingly, there is a need for a system for broadcast applications of liquid products capable of use from the beginning stages of plant growth through the later stages of the plants life to allow for the level of fertilization needed for new genetic plant nutrient needs and which directs the spray of the liquid product to minimize spray in the air above the plants.

BRIEF DESCRIPTION OF THE DRAWINGS

FIG. 1 is a front perspective view of an embodiment of a liquid placement apparatus showing an embodiment of a portion of a boom structure and an embodiment of a plurality of drop assemblies supported on the boom structure in the working position.

FIG. 2 is a side elevation view of FIG. 1 showing one of the drop assemblies mounted to the boom.

FIG. 3 is a top plan view of FIG. 1.

FIG. 4 is an enlarged rear elevation view of FIG. 1 showing the upper portion of the drop assembly of FIG. 1.

FIG. 5 is an enlarged perspective view of the embodiment of the drop assembly of FIG. 1.

FIG. 6 is an enlarged rear elevation view of the bottom portion of the drop assembly of FIG. 5

FIG. 7 is an embodiment of a manifold.

FIG. 8 is an enlarged rear perspective view an embodiment of a drop assembly mount.

FIG. 9 is a cross-sectional elevation view of the drop assembly mount of FIG. 8

FIG. 10 is an enlarged perspective view of an alternative embodiment of a portion of the drop assembly.

FIG. 11 is a partial, exploded view of the portion of the embodiment of the drop assembly of FIG. 10.

FIG. 12 is a front perspective view of another embodiment of a liquid placement apparatus showing an embodiment of a portion of a boom structure and an embodiment of a plurality of drop assemblies mounted forward of the boom structure in the working position.

FIG. 13 is a front elevation view of FIG. 12.

FIG. 14 is a front perspective view of the apparatus of FIG. 13 showing the drop assemblies in the folded transport position.

FIG. 15 is a front elevation view of FIG. 14.

FIG. 16 is a side elevation view of the embodiment of FIG. 12 showing the drop assembly in a rearward deflected position.

FIG. 17 is an enlarged partial cross-sectional view of the drop assembly mount of FIG. 16

FIG. 18 is a rear perspective view of another embodiment of a liquid placement apparatus showing an embodiment of a portion of a boom structure and an embodiment of a plurality of drop assemblies mounted rearward of the boom structure in the working position.

FIG. 19 is a rear elevation view of FIG. 18.

FIG. 20 is a rear perspective view of the apparatus of FIG. 18 showing the drop assemblies in the folded transport position.

FIG. 21 is a rear elevation view of FIG. 20.

FIG. 22 is a side elevation view of the embodiment of FIG. 18 showing the drop assembly in a rearward deflected position.

DESCRIPTION

Referring now to the drawing figures wherein like reference numerals designate the same components throughout the several views, FIG. 1, is a perspective view of a liquid placement apparatus 10 for spraying a liquid product, for example, a liquid fertilizer, a liquid herbicide, or a liquid insecticide. The apparatus 10 comprises a plurality of drop assemblies 100 supported from a boom structure 12 in spaced relation such that each drop assembly 100 may be positioned so as to be between adjacent rows of the row crop.

The boom structure 12 may be any type of structure mounted to any type of vehicle or carrier (not shown) such that the boom structure 12 is supported above the soil surface. Common boom lengths include 60 feet, 90 feet, and 100 feet. Depending on the size of the boom structure, the boom structure 12 may comprise a truss structure (such as shown in FIG. 1) or the boom structure may be a simple beam (FIG. 10). Additionally, depending on the size, the boom structure 12 may comprise a plurality of sections (e.g. left and right wing sections and a center section) with the wing sections designed to fold upwardly or pivot forwardly or rearwardly with respect to the center section or carrier for traveling on roads between fields and for storage. The boom structure 12 may also be designed to vertically raise and lower with respect to the carrier and the ground surface.

The carrier may be a tractor to which the boom structure 12 is directly coupled. Alternatively, the carrier may be a trailer, or other towable vehicle, designed to be towed behind the tractor with the boom structure 12 attached to the trailer. Alternatively, the carrier may be a self-propelled vehicle supporting the boom structure 12.

The liquid placement apparatus 10 is in liquid communication via distribution hoses 104 with one or more liquid tanks (not shown) which hold the liquid product to be sprayed. The distribution hoses 104 in combination with a pump (not shown) communicate the liquid product from the liquid tank to the drop assemblies 100 supported by the boom structure 12. The liquid tank(s) may be mounted on the carrier or towed by the carrier.

As best illustrated in FIGS. 1, 2, 5 and 6, the drop assembly 100 includes a vertical support member 102, such as a rod or tubular shape, and a spray assembly 110. The vertical support member 102 is supported from the boom structure 12 by a drop assembly mount 200 (discussed later). The spray assembly 110 may be movably secured along the length of the vertical support member 102 to vary the height of the spray assembly 110 with respect to the ground surface. The vertical support member 102 may comprise multiple tubular portions threadably connected or coupled together. The distribution hose 104 may be secured to the vertical support member 102 as shown in FIGS. 5 and 6 by any suitable means, e.g., cable ties. Alternatively, if the vertical support member 102 is a hollow tubular member, the distribution hose 104 may extend through the hollow tubular member to the spay assembly supported thereon. Alternatively, if the vertical support member 102 is a hollow tubular member, the distribution hose 104 may be coupled to the upper end of the vertical support member 102 by a fitting and the liquid product communicated to the spray assembly 110 through the vertical support member without the need for an internal hose.

Figure 6:
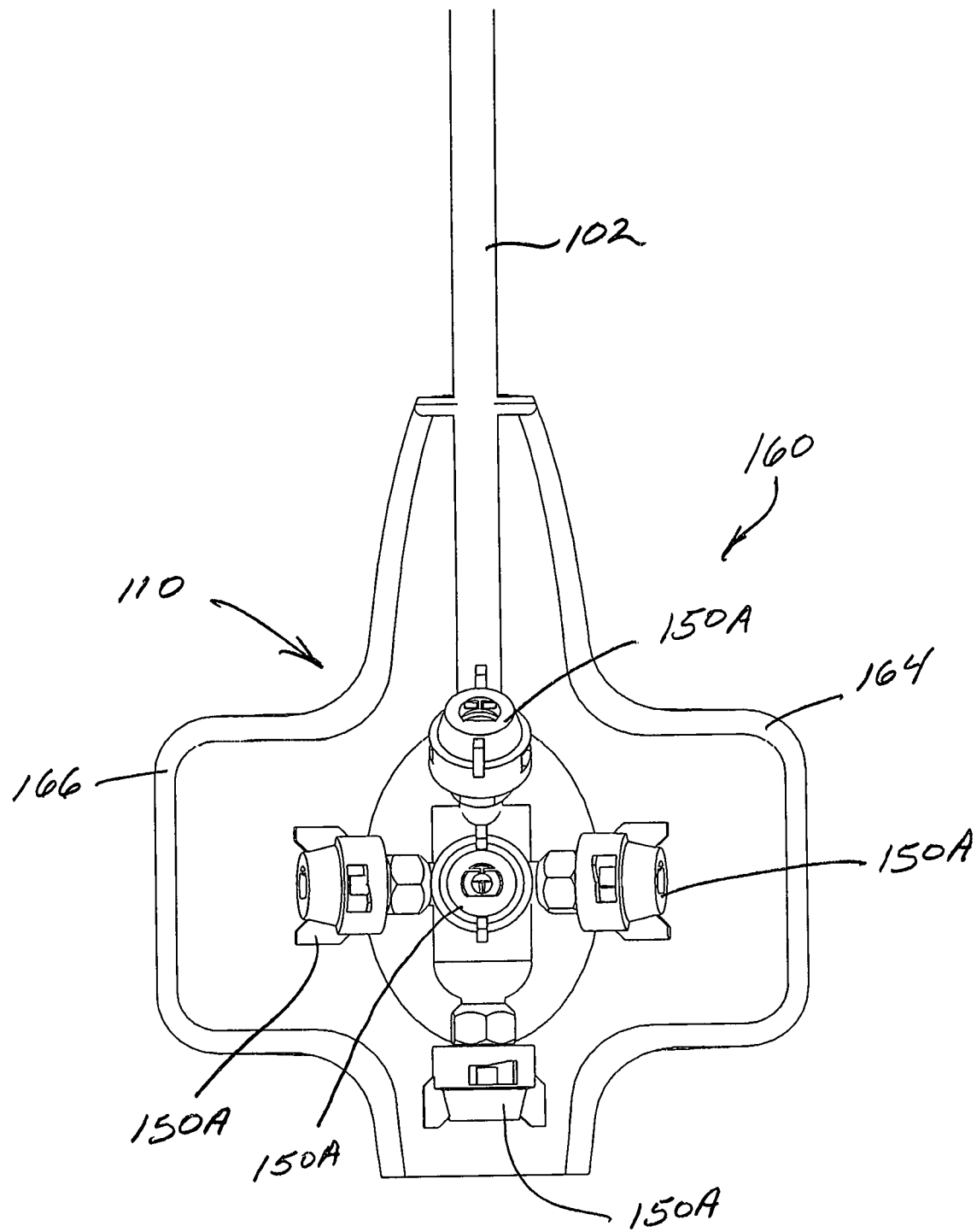

As best illustrated in FIG. 6, the spray assembly 110 may be configured to spray the liquid product in a single direction or in several directions or in different spray patters to allow an operator to spray various portions of the plant from above or below or laterally as the drop assembly 100 travels forwardly through the field as indicated by arrow 106 (FIG. 1). For example, if it is desired to spray a bottom surface of a plant (for example, an underside of a leaf) with the liquid product, the spray assembly 110 may be placed below the leaf and may be configured so the liquid product is sprayed upwards and onto the bottom surface of the plant. In the alternative, if it is desired to spray an upper surface of a plant (for example, a top of a leaf) the spray assembly 110 may be arranged higher than the leaf and reconfigured to spray the liquid downwards to apply the liquid product to the upper surface of the plant. Additionally, as the spray assembly 104 moves through the field, the spray assembly 110 may be configured to spray the liquid product in a direction of travel 106, opposite the direction of travel, perpendicular to the direction of travel, and/or anywhere between. In addition, the spray assembly 110 may be configured so that liquid product may be sprayed simultaneously in multiple directions or selectively sprayed in different directions as the spray assembly 110 travels through the field. Thus, it should be appreciated that the spray assembly 110 may allow for precise control of applying a liquid product to a plant.

Figure 7:
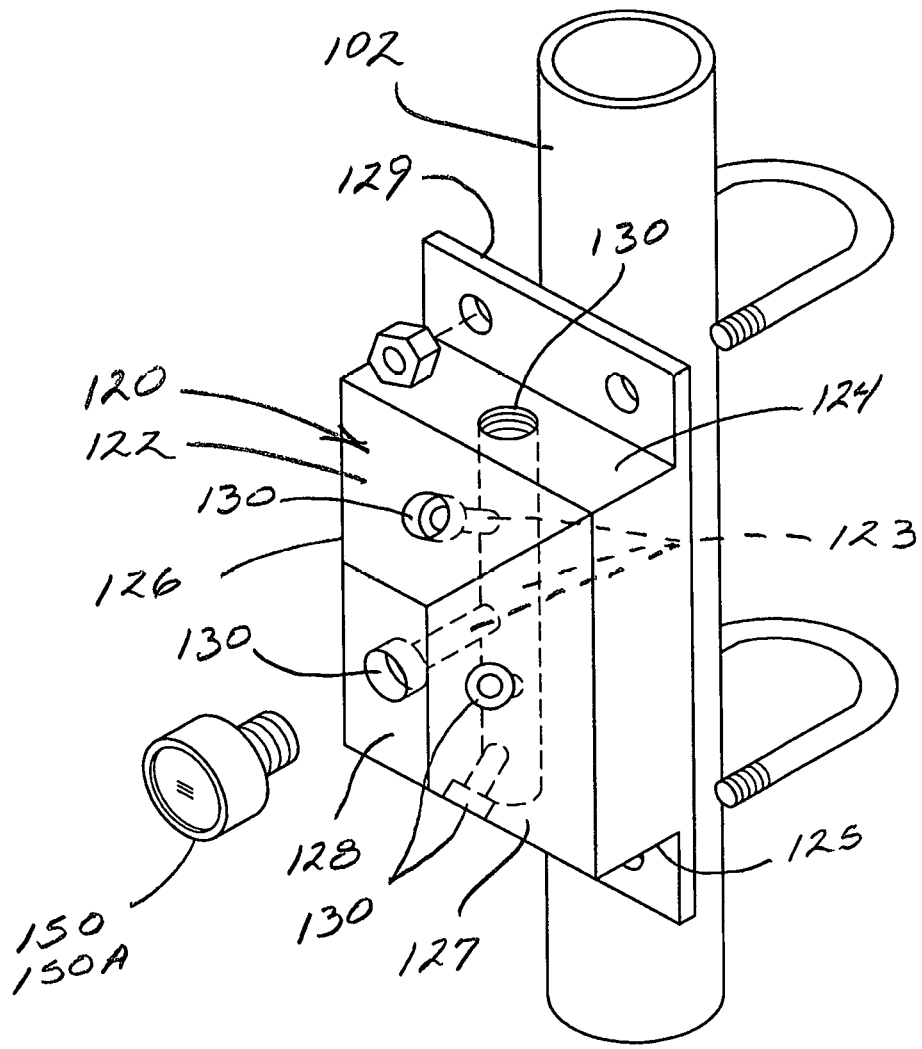

As shown in FIGS. 6 and 7, the spray assembly 110 may include a manifold 120 to which a plurality of attachments 150 (discussed later) are connected. The manifold 120 may have a body 122 with various liquid passages 123 formed therein. For example the body 122 may be formed from a metal such as, but not limited to, aluminum, iron, brass, or steel, or a nonmetal, such as, but not limited to, plastic. The manifold body 122 may be made by various processes, including but not limited to, a casting process wherein the passages 123 are created during the casting process. Alternatively, the manifold body 122 may be made from a casting process and the passages 123 may be added later via a machining process. The embodiments are not limited by the manner in which the manifold body 122 is made as there are other methods available such as, but not limited to, forging or printing.

Referring to FIG. 7, the manifold body 122 may have several faces. For example, the body 122 may have a top face 124, a bottom face 125, a left side face 126, a right side face 127, a front face 128, and a back face 129. Each face may include one or more ports 130 in communication with the liquid passages 123. The ports 130 may be internally threaded to threadably receive the externally threaded stems of the attachments 150.

The attachments 150 may be spray nozzles, plugs or couplers which may facilitate coupling of another component to the manifold body 122. For example, one of the ports 130 in the top face 124 may receive a coupler (not shown) for connecting a tube or a hose which delivers the liquid product to the manifold body 122. Similarly, one of the ports 130 in the bottom face may receive a coupler to attach another tube or hose for delivery of liquid product to a second spray assembly 110 disposed on the vertical support member 102 below the first spay assembly 110 or to another type of liquid delivery apparatus (e.g. dribble assembly, discussed later).

It should be appreciated that if the attachments 150 are spray nozzles 150A coupled to the various faces of the manifold body 122, the spray nozzles will be oriented based on the orientation of the manifold faces to direct the spray in the corresponding orientation of the respective faces. For example, in the embodiment shown, the nozzles may spray upwards, downwards, laterally (i.e., sideways with respect to the direction of travel), rearward with respect to the direction of travel or any combination thereof. The spay nozzles 150A may also be of the type that allows the spay nozzle to pivot (e.g., a ball joint) such that the spray nozzles may be manually oriented differently with respect to the orientation of the corresponding face of the manifold body to achieve the desired spray pattern or spray orientation. It should be appreciated that the spray nozzles 150A may be configured with actuators (e.g., motors), which may allow the operate to orient the nozzles remotely using a controller to control the motors from the cab of the carrier in order to manipulate the orientation of the spray nozzles on-the-go to achieve a desired spray pattern.

To protect the nozzles 150A and to direct plant material away from the spray assembly 110 as it travels through the field, a cover 160 may be provided. The cover 160 may be clamped or otherwise secured to the vertical support member 102 or to the manifold body 122. The cover 160 may be shaped to assist in keeping the spray assembly between the crop rows while also protecting the spray assembly 110 from impact with rocks or other obstructions that may be encountered during use. It should be appreciated that the configurations of the cover 160 will vary depending on the overall size and shape of the spray assembly and the manifold body and minimize interference with the spray from the nozzles. In the embodiment shown, the cover 160 includes a forwardly projecting point 162, left and right wings 164, 166 which protect the nozzles that are oriented to spray laterally or transverse from the direction of travel 106.

Figure 4:
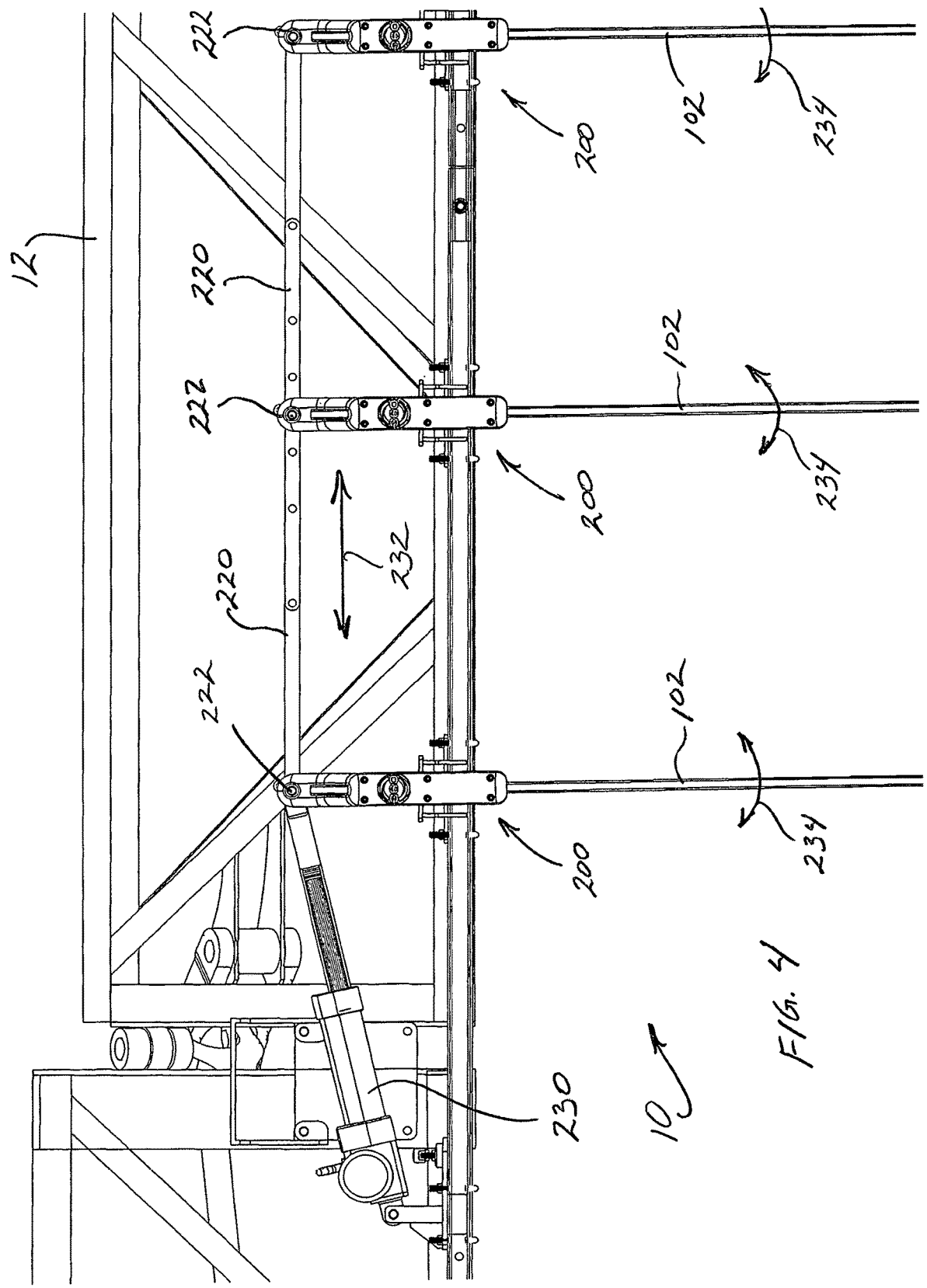
Figure 5:
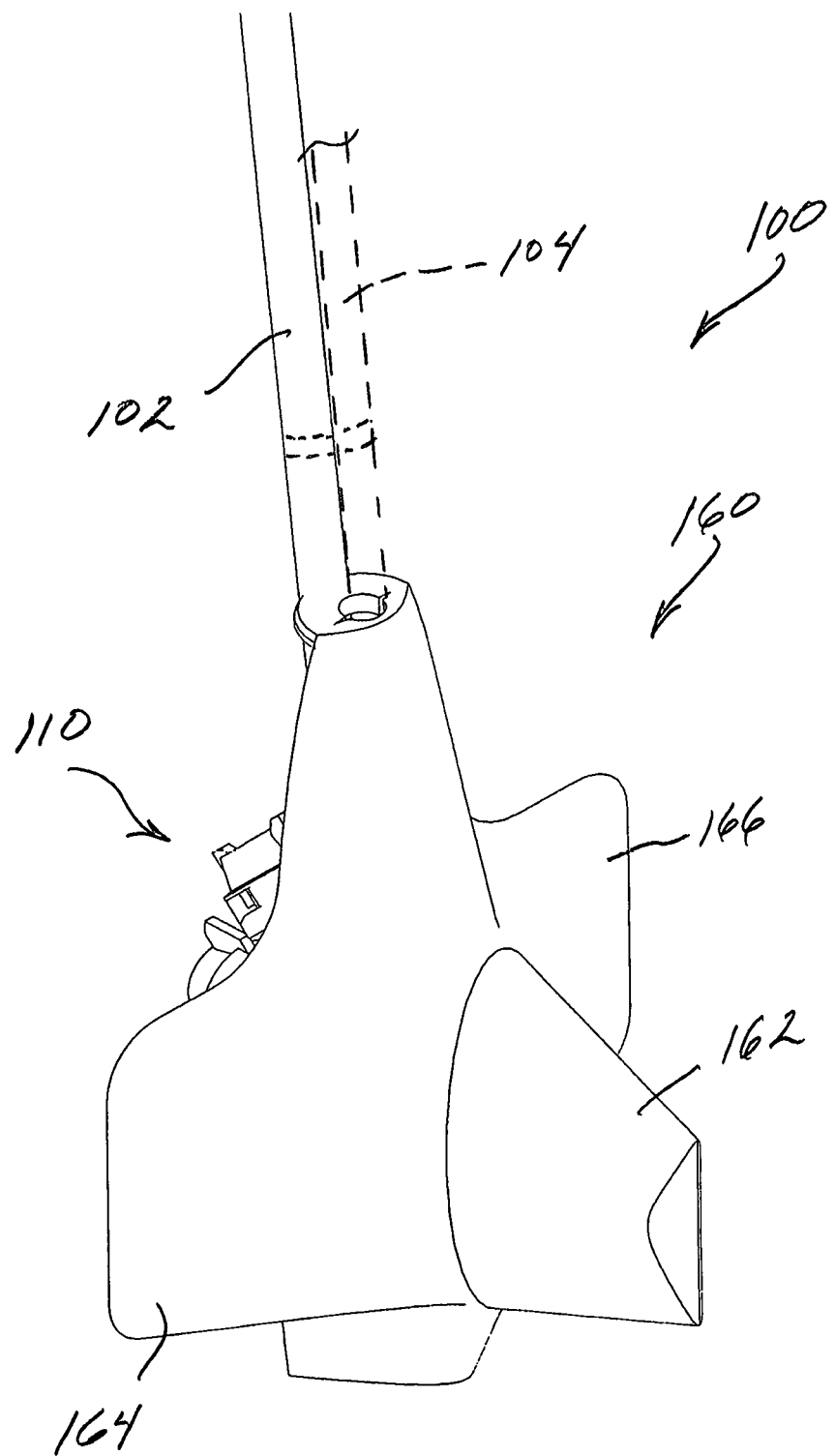
Figure 8:
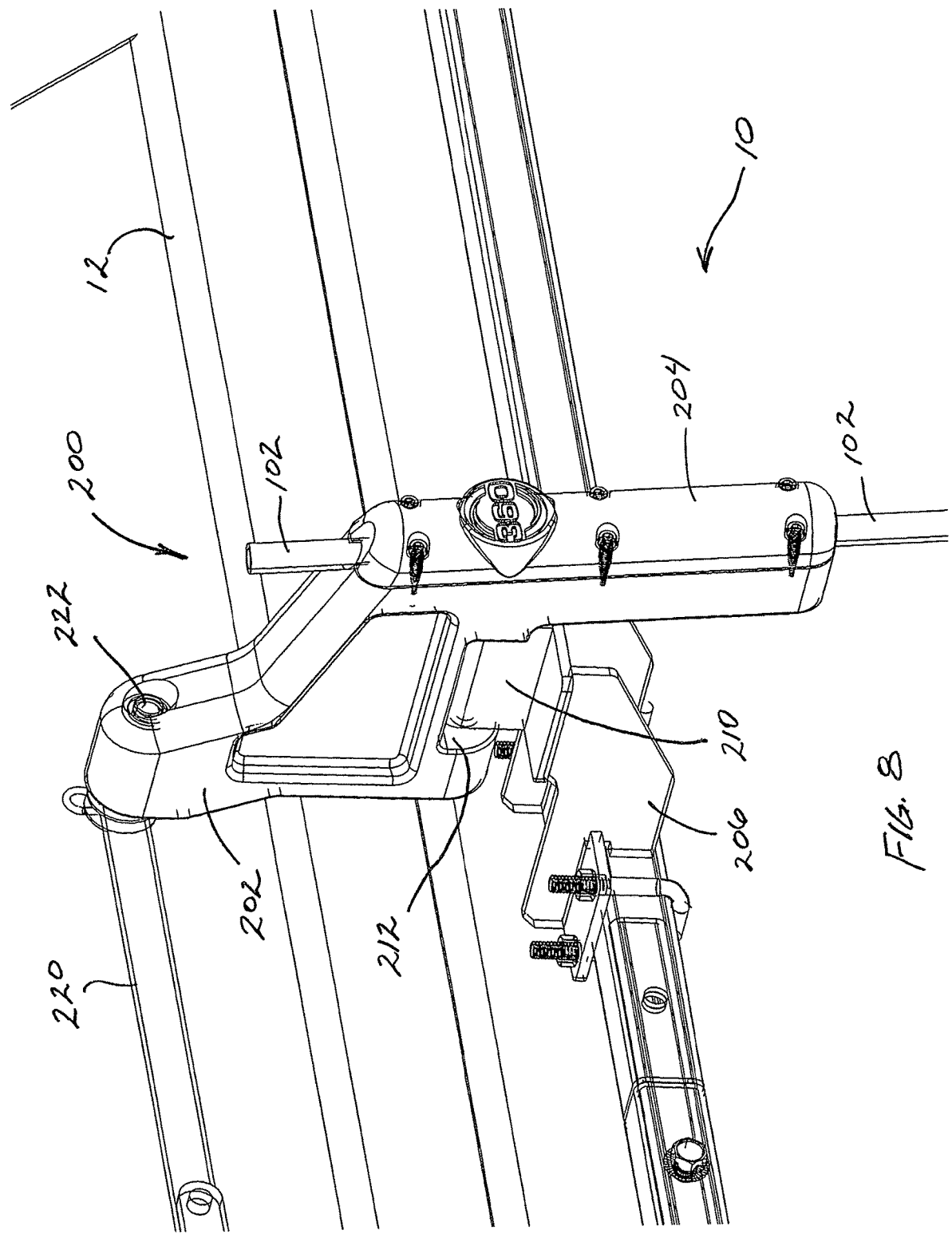
Figure 9:
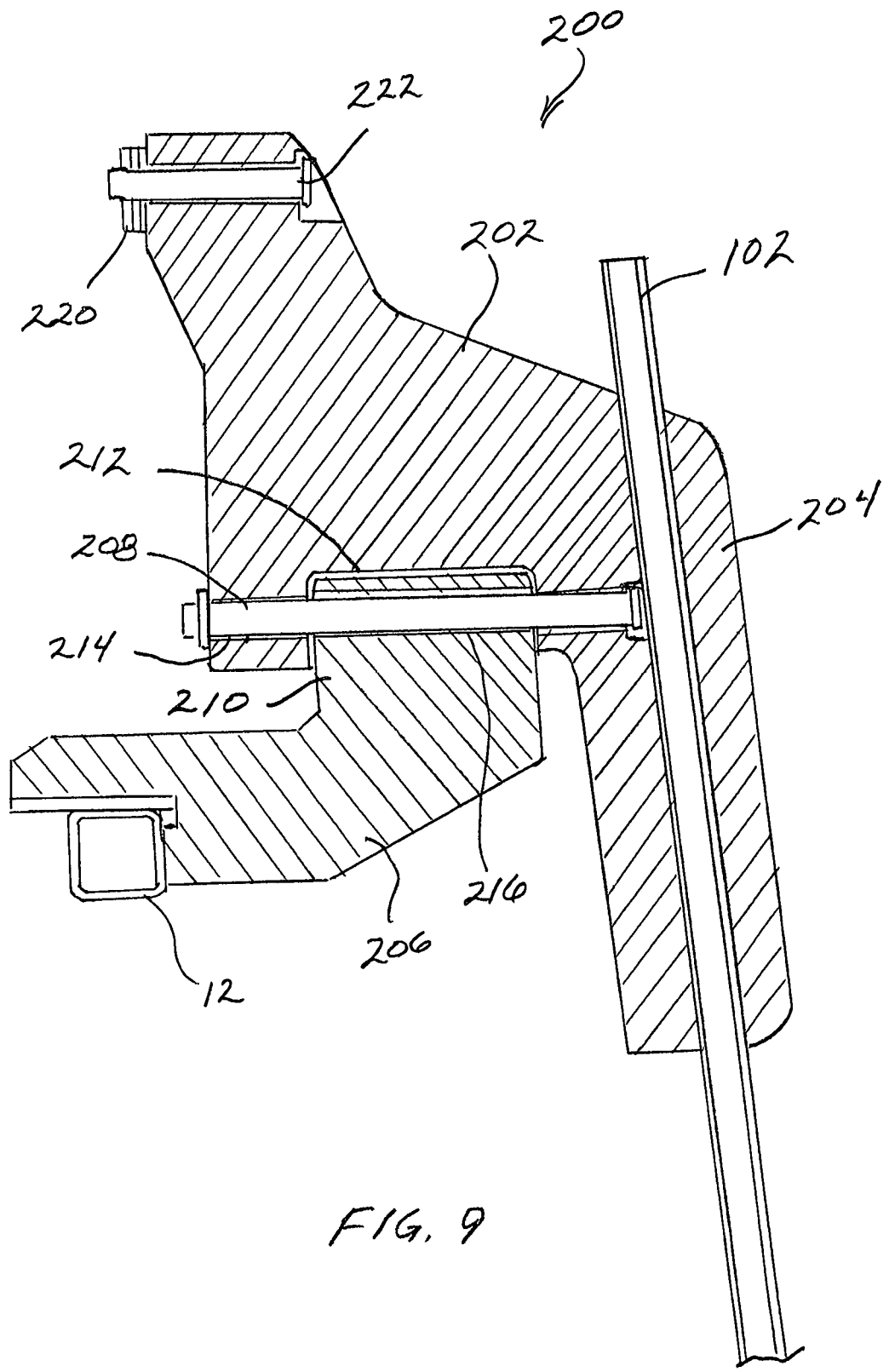

Referring now to FIGS. 4, 8 and 9, an embodiment of the drop assembly mount 200 is shown. In this embodiment, the drop assembly mount 200 includes a main body 202 and a front cap 204 which threadably attaches to the main body 202 by threaded connectors. The vertical support member 102 is received and clamped between the main body 202 and the cap member 204 which allows the vertical support member 102 to be vertically adjusted with respect to the main body 202.

As best illustrated in FIGS. 8 and 9, the drop assembly mount 200 further includes a boom mounting bracket 206 which may attach to the boom structure 12 in any suitable manner. In the embodiment shown, U-bolts 207 (FIG. 8) are used to clamp the boom mounting bracket 206 to the boom structure 12, permitting the boom mounting bracket 206 to be positioned along the boom structure at the desired spacing corresponding to the crop rows or other desired spacing.

In the embodiment shown, the main body 202 is pivotally attached to the boom mounting bracket 206 by a removable pivot pin 208 extending through aligned apertures 214, 216 of an upwardly extending ear 210 of the boom mounting bracket 206 received within a mating recess 212 of the main body 202. Referring to FIG. 4, a gang of drop assemblies 100 supported from the boom structure 12 may be linked by linkages 220 pinned to the main bodies 202 of adjacent drop assemblies 100 by pins 222. An actuator 230 (e.g., an electric or hydraulic cylinder) coupled to the linkages 220 may be extended or retracted which causes the linkages 220 to translate side-to-side as indicated by arrow 232 (FIG. 4). The translation of the linkages 220, in turn, causes the gang of drop assemblies 100 to swing or pivot together, each about their respective pivot pins 208 or pivot axis, thereby allowing the linked gang of drop assemblies assemblies 100 to be raised together from a working position (such as shown in FIGS. 1, 13, 14, 19 and 20) to a folded or transport position (such as shown in FIGS. 15, 16, 21 and 22). It should be appreciated that rather than using an actuator, a lever (not shown) may be used to manually move the gang of drop assemblies together from a working position to a transport position and vice-versa. Additionally, rather than moving a gang of drop assemblies together via a linkage, each drop assembly may be individually manually pivoted about its pivot pin or pivot axis 208 and locked into position in either the working position or transport position by a locking pin (not shown).

Figures 10, 11:
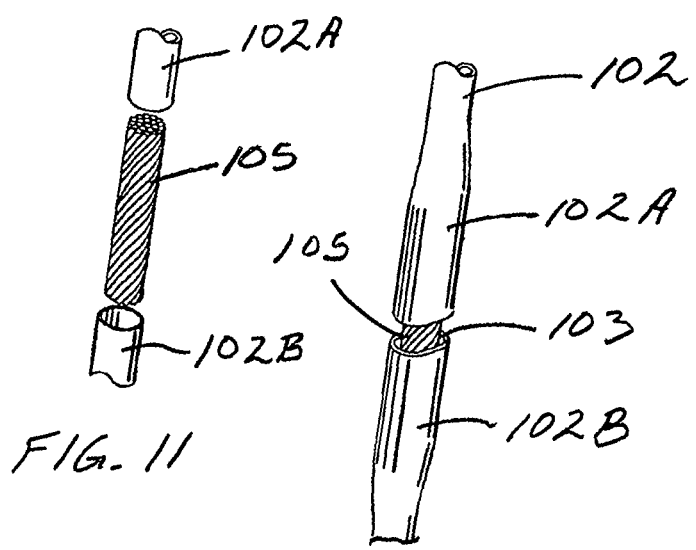
Figure 13:
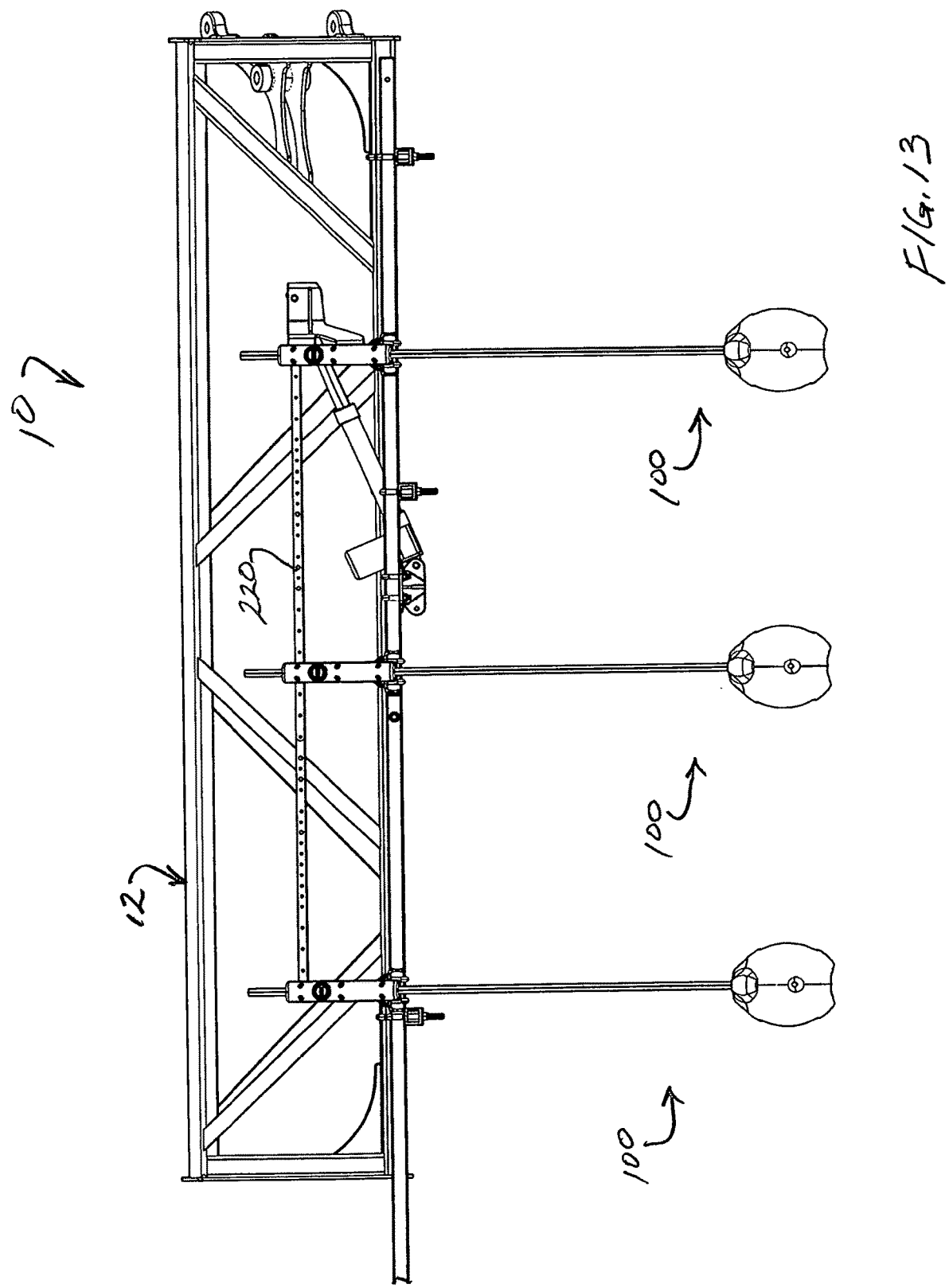
Figure 14:
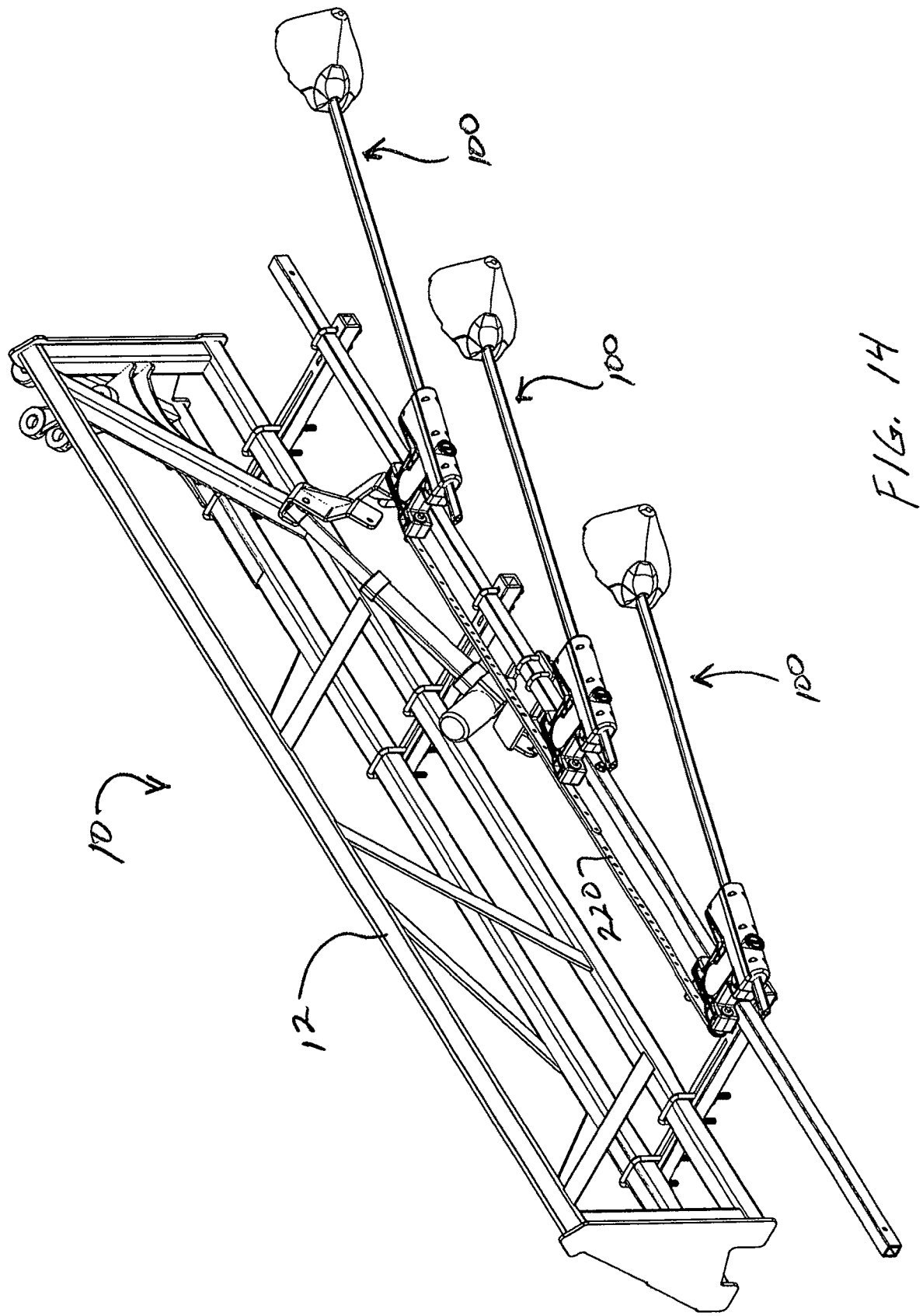
Figure 15:
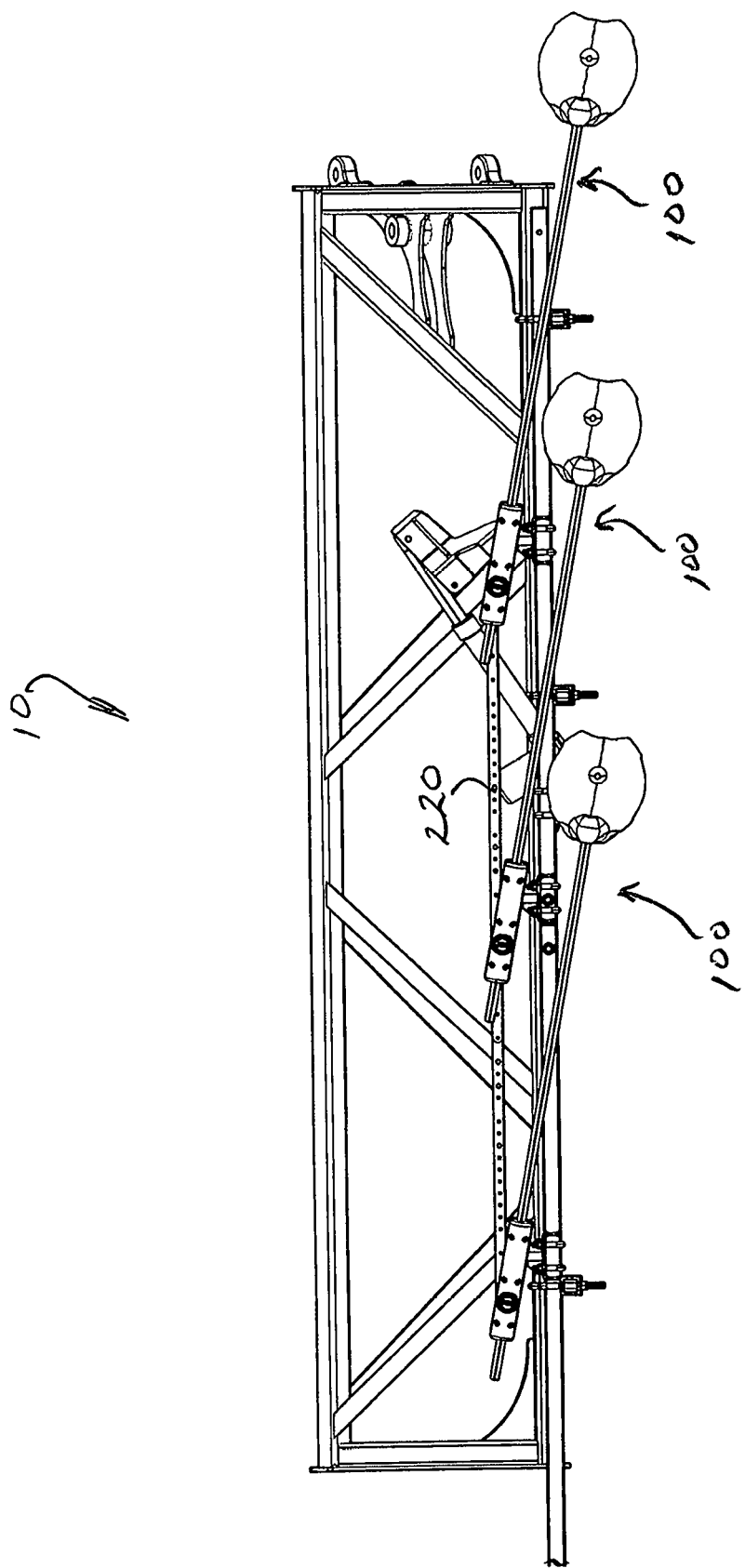

In another alternative embodiment, as shown in FIGS. 10-11, the vertical support member 102 may have an upper portion 102A and a lower portion 102B separated by a gap 103 and joined together by a cable 105 to provide flexible joint. The cable 105 may be secured within the upper portion 102A and the lower portion 102B by crimps or other suitable connection means. The gap 103 allows the lower portion 102B to move relative to the upper portion 102A, such as, for example, when an obstacle is encountered. It should be appreciated that if such a flexible connection is incorporated into the vertical support 102 of the drop assembly 100, when drop assembly 100 is folded from the working position to the transport position, the lower portion 102B of the vertical support may bend or hang downwardly when in the transport position, which may be undesirable in some circumstances.

In order to provide flexibility to the drop assemblies 100, such that the drop assembly is able to flex or deflect rearwardly upon encountering an obstruction in the field, an alternative drop assembly mount 400 is illustrated in FIGS. 12-21.

As in the previous embodiment, each drop assembly 100 includes a vertical support member 102, such as a rod or tubular shape, and a spray assembly 110. Each spray assembly includes a manifold 120 to which a plurality of attachments 150, such as spray nozzles 150A are secured. To protect the nozzles 150A and to direct plant material away from the spray assembly 110 as it travels through the field, a cover 160 may be provided. The cover 160 may be clamped or otherwise secured to the vertical support member 102 or to the manifold body 122.

The drop assembly mount 400 is similar to the drop assembly mount 200 previously described in that it includes a main body 402, but unlike the previous embodiment, the drop assembly mount also includes secondary body 420 which pivots with respect to the main body 402. The secondary body 420 includes a cap 404 which threadably attaches to the secondary body 420 by threaded connectors. The vertical support member 102 is received and clamped between the secondary body 420 and the cap 404 which allows the vertical support member 102 to be vertically adjusted with respect to the secondary body 420.

As in the previously described drop assembly mount 200, the drop assembly mount 400 includes a boom mounting bracket 406 which may attach to the boom structure 12 in any suitable manner. In the embodiment shown, U-bolts 407 (FIG. 12, 16) are used to clamp the boom mounting bracket 406 to the boom structure 12, permitting the boom mounting bracket 406 to be positioned along the boom structure at the desired spacing corresponding to the crop rows or other desired spacing.

Also as in the previously described drop assembly mount 200, in the drop assembly mount 400, the main body 402 is pivotally attached to the boom mounting bracket 406 by a removable pivot pin 408 extending through aligned apertures 414, 416 of an upwardly extending ear 410 of the boom mounting bracket 406 received within a mating recess 412 of the main body 402. Referring to FIGS. 12-15, a gang of drop assemblies 100 supported from the boom structure 12 may be linked by linkages 220 pinned to the main bodies 402 of adjacent drop assemblies 100 by pins 222. An actuator 230 (e.g., an electric or hydraulic cylinder) coupled to the linkages 220 may be extended or retracted which causes the linkages 220 to translate side-to-side. The translation of the linkages 220, in turn, causes the gang of drop assemblies 100 to swing or pivot together, each about their respective pivot pins 408 or pivot axis, thereby allowing the linked gang of drop assemblies assemblies 100 to be raised together from a working position (such as shown in FIGS. 13, 14, 19 and 20) to a folded or transport position (such as shown in FIGS. 15, 16, 21 and 22). As in the previously described embodiment, rather than using an actuator, a lever (not shown) may be used to manually move the gang of drop assemblies together from a working position to a transport position and vice-versa. Additionally, rather than moving a gang of drop assemblies together via a linkage, each drop assembly may be individually manually pivoted about its pivot pin or pivot axis 408 and locked into position in either the working position or transport position by a locking pin (not shown).

Figure 16:
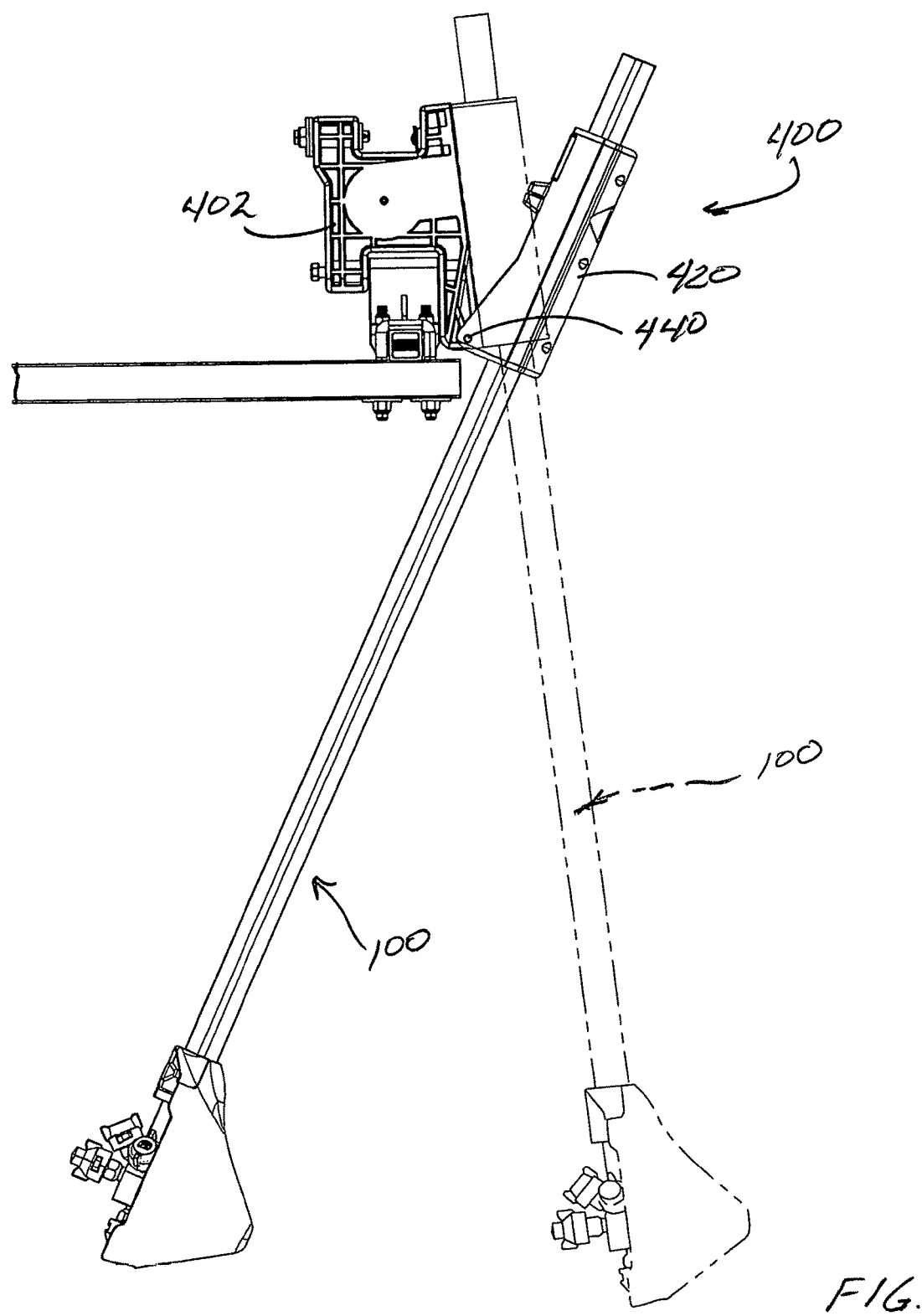
Figure 17:
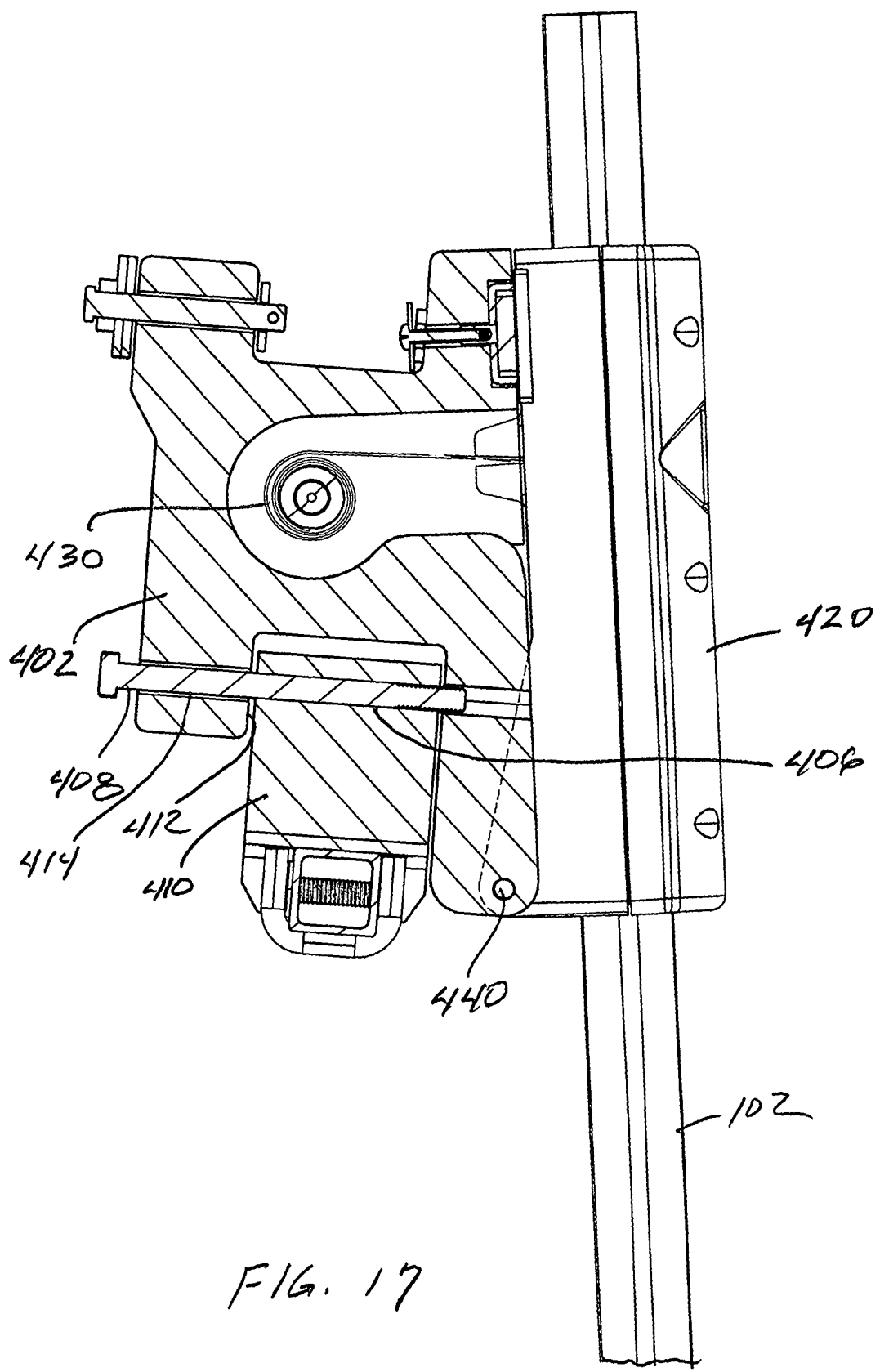
Figure 18:
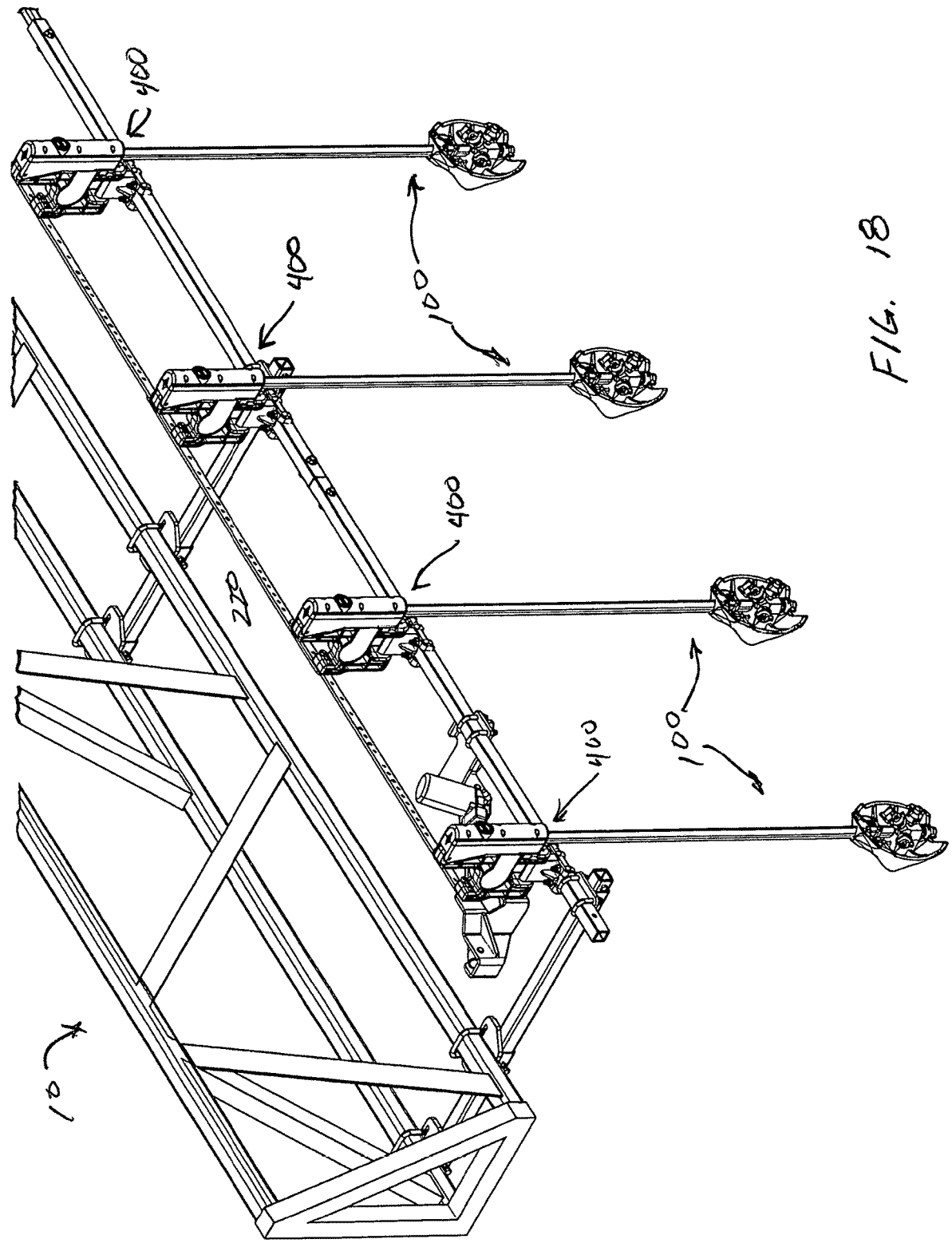
Figure 19:
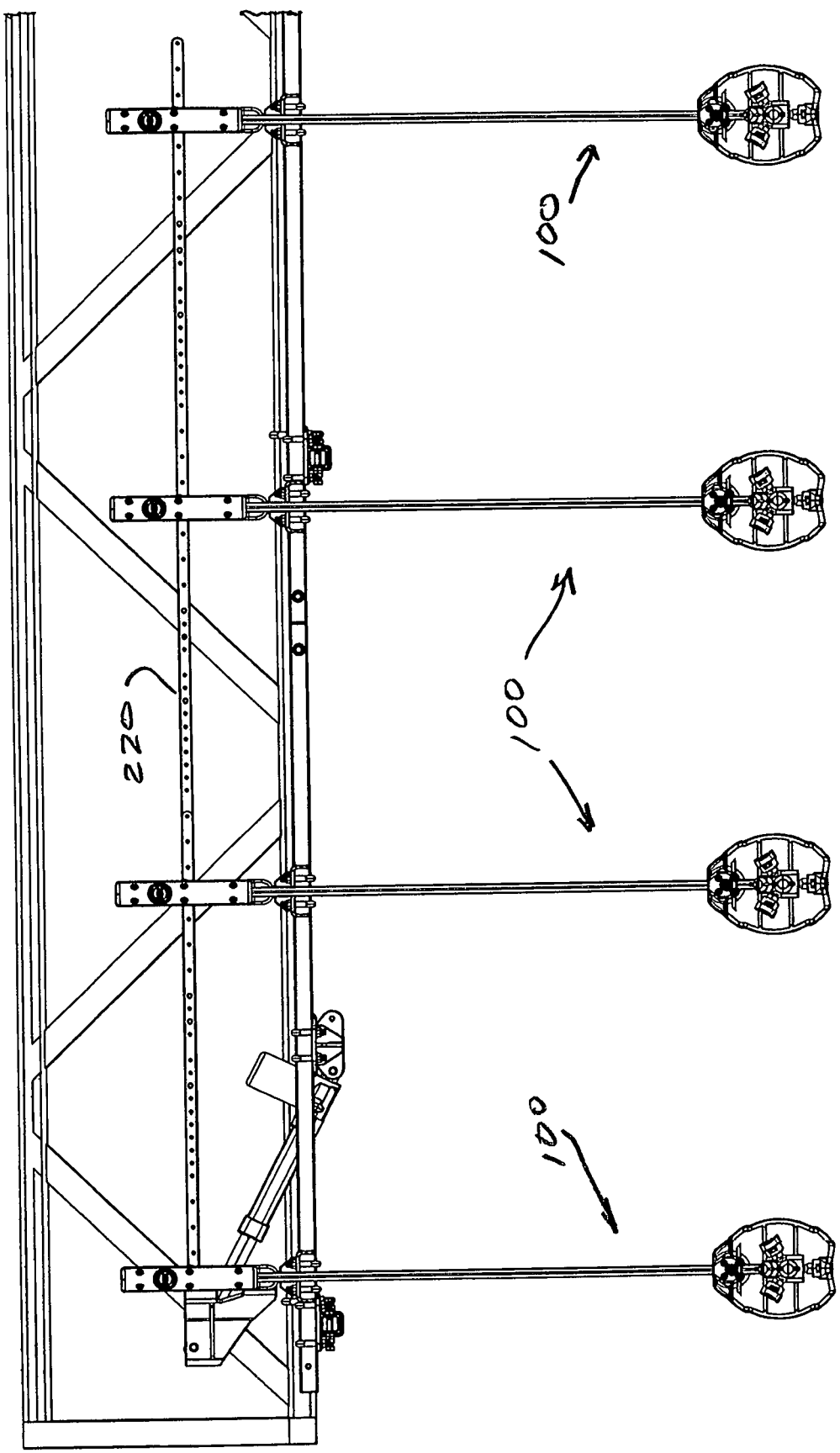
Figure 20:
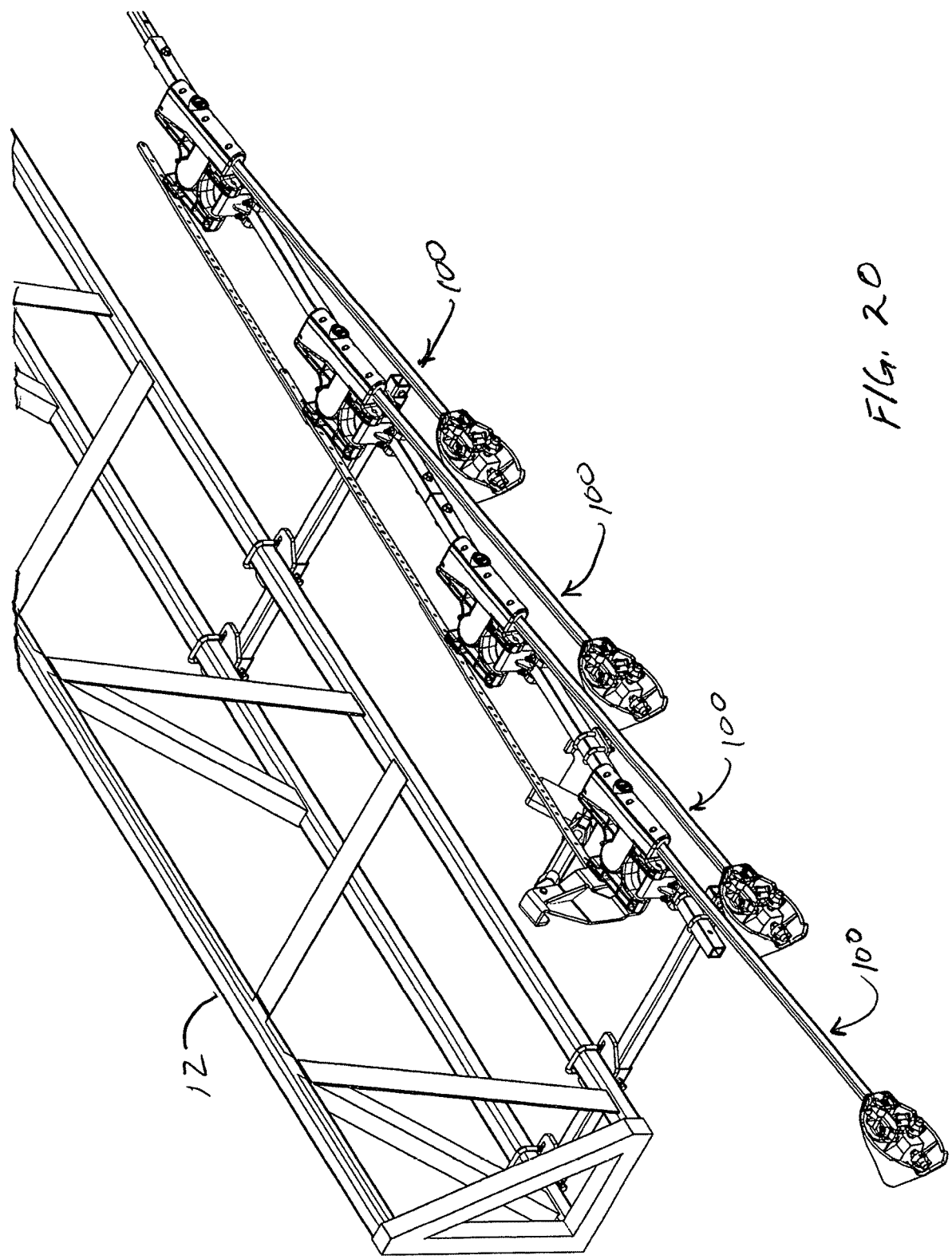
Figure 21:
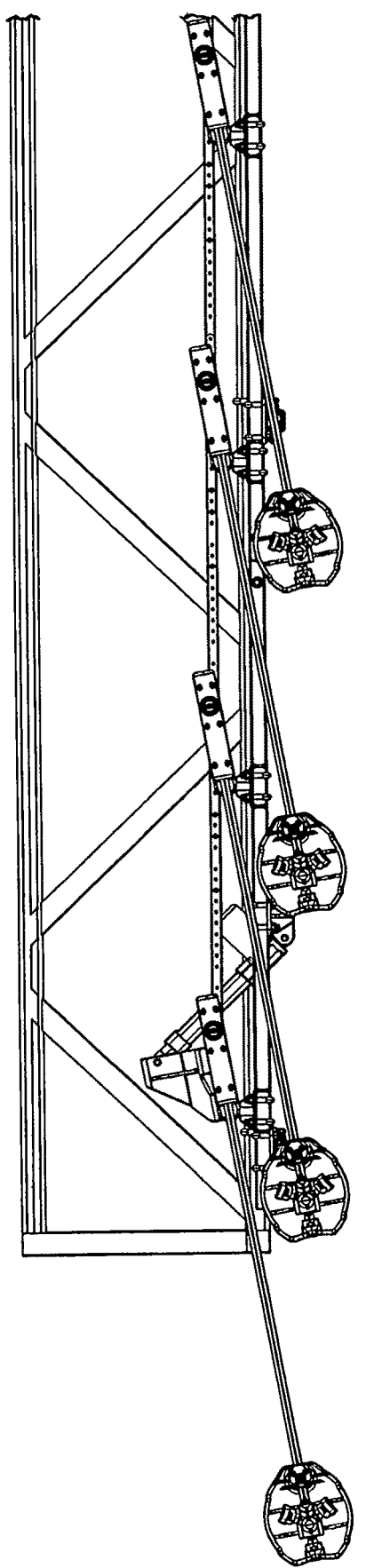
Figure 22:
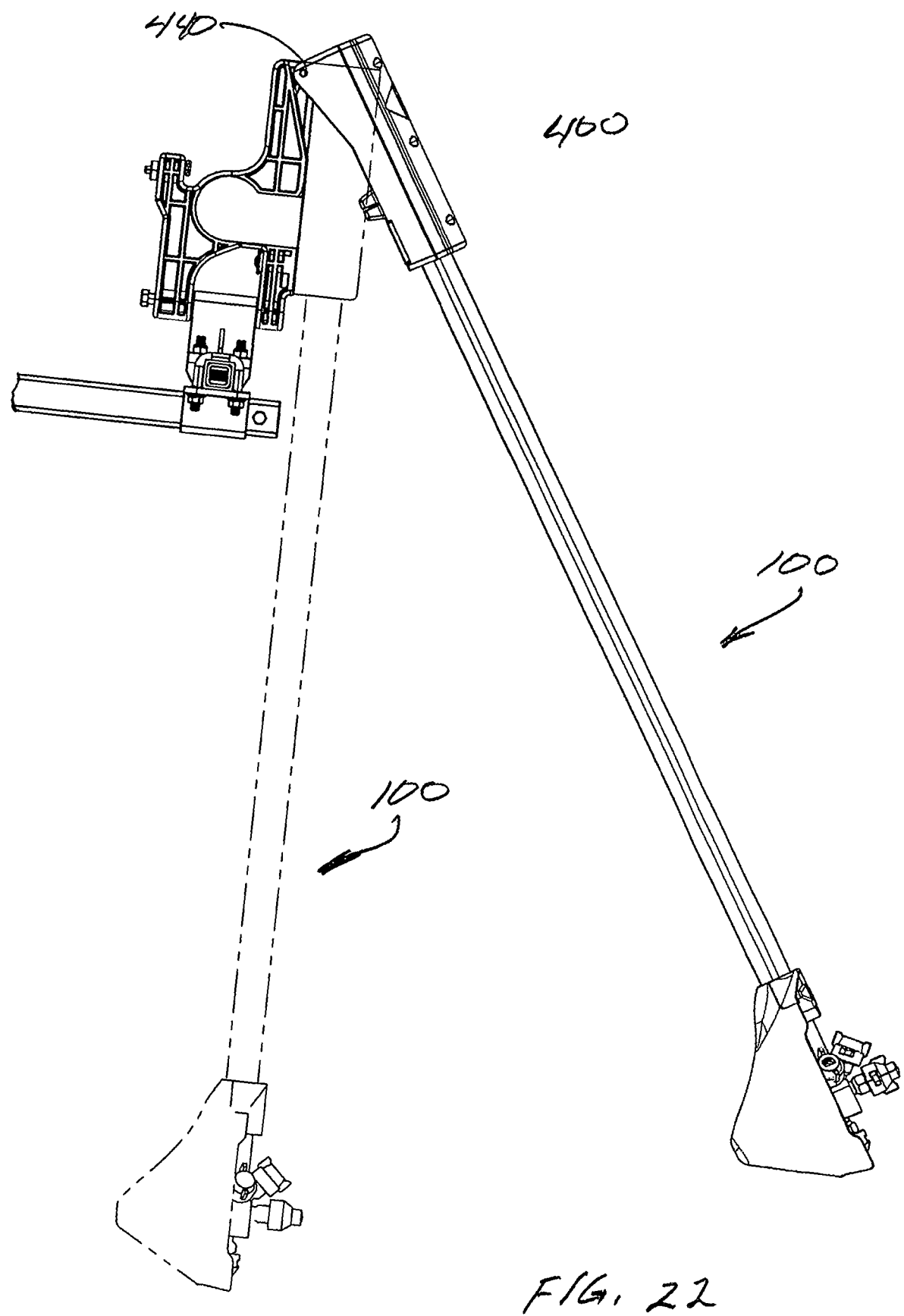

Referring to FIGS. 16, 17 and 22, the secondary body 420 pivots with respect to the main body 402 about a second pivot axis 440 which is oriented parallel to the boom 12, such that the vertical support 102 clamped within the secondary body 420 can deflect rearwardly with respect to the forward direction of travel 106 from the non-deflected position (shown in phantom lines in FIGS. 16 and 22) to the rearwardly deflected position (shown in solid lines in FIGS. 16 and 22). It should be appreciated that depending on whether the boom mounting bracket is mounted to the forward side of the boom 12 (FIGS. 12 and 16) or the rearward side of the boom 12 (FIGS. 18 and 22) the second pivot axis 440 may be disposed toward the upper end of the boom mounting bracket (FIG. 16) or the lower end of the boom mounting bracket (FIG. 22).

The main body 402 includes a biasing member 430 disposed within an internal cavity 432. In one embodiment, the biasing member 430 is a constant force spring. However, it should be appreciated that any other resilient member or spring may be used to bias the secondary body 420 to the main body402. The constant force spring may be mounted on a spool within the cavity 432 and/or be used in tandem or back-to-back with another constant force spring. The attachment end of the constant force spring is removably attached to secondary body 420. In this manner, the vertical support member 102 is retained in a substantially vertical position and, after an obstruction is encountered, will return with assistance from the rearwardly deflected position back to a substantially vertical position.

In addition, magnets 450, 452 may be disposed in the main body 402 and the secondary body 420 to provide additional bias or resistance against rearward deflection. In such an embodiment, a sufficient force to break the magnetic attraction between the main body 402 and secondary body 420 will be required before the secondary body 420 and vertical support member 102 will deflect rearwardly.

As previously indicated, in each of the embodiments, the spray assembly 110 may be attached anywhere along the vertical support member 102 and multiple spray assemblies 110 may be mounted along the vertical support member 102. This may also be advantageous in the event a multitude of spray patterns are desired. For example, an upper spray assembly 110 may be configured to apply a spray of liquid lateral to a direction of travel whereas a lower spray assembly 110 may be configured to apply liquid downward on the ground.

In addition, the vertical support member 102 may support other liquid delivery devices such as a "dribble assembly" which "dribbles" liquid product onto the soil surface via dribble tubes as disclosed in Applicant's published International Patent Application No. WO2015/154027, which is incorporated herein, in its entirety by reference.

It should also be appreciated that different liquid product may be delivered at the same time using multiple spray assemblies 110 attached to the vertical support member 102 or using the spray assembly 110 and other liquid applicators, such as the dribble assemblies. For example, a first spray assembly 110 may be in communication with a first liquid tank holding a first liquid product (e.g., an insecticide) and a second spray assembly 110 or other liquid product applicator may be in communication with a second liquid tank holding a second liquid product (e.g., fertilizer).

The embodiments of the liquid placement apparatus 10 described herein allow for efficiencies in fertilizer usage and higher yield potential by creating the ability to feed plants just prior to the plants' specific crop nutrient needs, thereby helping the genetics to reach their full potential. The liquid placement apparatus may place the nutrients near the rhizosphere in a moisture zone for the process of mineralization. Nutrients can either be taken in by the plants by mass flow or diffusion, thereby minimizing the environmental footprint left during fertilizer application. With the liquid placement apparatus 10, an early time line of opportunity of application is achieved and ranges from the early vegetative stages of a plant's life to the middle reproductive stages of the plant's life. This range creates a large window of opportunity for applicators to achieve new levels of fertilization for higher yields and to achieve more efficient use of fertilizer, thereby reducing surface contamination.

It should be appreciated that although the various embodiment of the liquid placement apparatus 10 described and illustrated herein is particularly adapted for row crops, any of the embodiments may be used for liquid application to other crops.

The embodiments disclosed herein are intended in all respects to be illustrative rather than restrictive and many variations and modifications will be readily apparent to those of skill in the art.

The invention claimed is:

1. A method of applying liquid product to a crop growing in a field, the method comprising:
   selectively adjusting a boom structure relative to a height of the crop or a height above a soil surface, the boom structure supported by a carrier and capable of extending transverse to a direction of travel, the boom structure supporting a plurality of drop assemblies laterally spaced along the boom structure and secured thereto by one of a corresponding plurality of drop assembly mounts, each of the plurality of drop assemblies including a vertical support member and a spray assembly disposed at a lower end of the vertical support member, each of the plurality of drop assembly mounts having a first pivot pin defining a first pivot axis oriented substantially perpendicular to the boom structure and a second pivot pin defining a second pivot axis vertically offset from the first pivot axis, the second pivot axis oriented substantially parallel to the boom structure;
   selectively adjusting each of the plurality of drop assemblies between a transport position and a working position, wherein in the transport position the vertical support member is pivoted about the first axis such that the vertical support member is oriented toward the boom structure, and in the working position the vertical support member is oriented substantially perpendicular to the boom structure;
   wherein in the working position the vertical support member is capable of pivoting about the second pivot axis such that the vertical support member is capable of deflecting rearward with respect to the direction of travel upon the vertical support structure encountering an obstruction in the field, the vertical support member being biased by a biasing member against rearward deflection such that in the event of rearward deflection upon encountering the obstruction in the field, the vertical support returns to normal with respect to the soil surface;
   with the drop assemblies in the working position, communicating the liquid product from a storage tank supported by the carrier to the plurality of drop assemblies such the liquid product is sprayed onto the crop by the spray assemblies.

2. The method of claim 1, wherein the biasing member is a spring.

3. The method of claim 2, wherein the biasing member is a constant force spring.

4. The method of claim 3, wherein the constant force spring is mounted to a spool disposed within a cavity in the drop assembly mount.

5. The method of claim 1, wherein the biasing member is a magnet.

6. The method of claim 1, wherein the biasing member includes both a spring and a magnetic.

7. The method of claim 1, wherein a gang of the plurality of drop assemblies are coupled by a linkage attached to an actuator.

8. The method of claim 7, further including:
   actuating the actuator to cause the gang of drop assemblies to pivot together, each about their respective first axis, between the transport position and the working position.

9. The method of claim 1, wherein each the plurality of drop assembly mounts includes:
   a boom mounting bracket secured to the boom support structure, the boom mounting bracket supporting the first pivot pin;
   a main body rotatable about the first pivot pin;
   a second body pivotally attached to the main body by the second pivot pin, the second body supporting the vertical support member.

10. The method of claim 9, wherein the biasing member is a spring coupling the main body and the second body.

11. The method of claim 10, wherein the biasing member is a constant force spring.

12. The method of claim 11, wherein the constant force spring is mounted to a spool disposed within a cavity in the main body.

13. The method of claim 9, wherein the biasing member is a magnet coupling the main body and the second body.

14. The method of claim 9, wherein the biasing member includes both a spring and a magnetic coupling the main body and the second body.

15. The method of claim 9, wherein a gang of the plurality of drop assemblies are coupled by a linkage attached to an actuator.

16. The method of claim 15, further including:
   actuating the actuator to cause the gang of drop assemblies to pivot together, each about their respective first axis, between the transport position and the working position.

\* \* \* \* \*

UNITED STATES PATENT AND TRADEMARK OFFICE
CERTIFICATE OF CORRECTION

PATENT NO. : 10,849,319 B2  
APPLICATION NO. : 15/620822  
DATED : December 1, 2020  
INVENTOR(S) : Lee Dahlhauser and Lucas Helton Page 1 of 1

It is certified that error appears in the above-identified patent and that said Letters Patent is hereby corrected as shown below:

In the Claims

Claim 6, Column 8, Line 41, replace "magnetic." with -- magnet. --

Claim 14, Column 9, Line 2, replace "magnetic" with -- magnet --

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*